United States Patent [19]

Neidell

[11] 4,187,006

[45] Feb. 5, 1980

[54] FLIP-DOWN SUNGLASSES

[75] Inventor: Saul Neidell, Fairlawn, N.J.

[73] Assignee: Premier Athletic Products Corp., East Rutherford, N.J.

[21] Appl. No.: 927,955

[22] Filed: Jul. 26, 1978

[51] Int. Cl.² ............................................. G02C 13/00
[52] U.S. Cl. ........................................ 351/44; 2/13; 351/57; 351/154
[58] Field of Search ................ 351/44, 45, 47, 49, 351/41, 111–113, 59, 114, 66, 156, 18, 128, 154, 155, 51, 91; 2/13, 15

[56] References Cited

U.S. PATENT DOCUMENTS

| | | | |
|---|---|---|---|
| 1,181,291 | 5/1916 | Clarke | 351/47 |
| 1,879,216 | 9/1932 | Hannan et al. | 351/44 |
| 1,980,101 | 11/1934 | Schneider | 351/48 |
| 2,616,082 | 11/1952 | Creighton | 351/44 |

Primary Examiner—John K. Corbin
Assistant Examiner—B. W. de los Reyes
Attorney, Agent, or Firm—Hopgood and Calimafde

[57] ABSTRACT

Flip down sunglasses suitable for use in athletic competition are provided. A fixed part is attached to the wearer's forehead by means of ear pieces and an adjustable strap. A movable part is pivotally mounted to the fixed part and carries a sun visor. The sun visor may be locked into position both vertically and horizontally by means of grooves carried on flexible arms joined to the fixed part to engage ribs carried on the movable part.

7 Claims, 6 Drawing Figures

FLIP-DOWN SUNGLASSES

BACKGROUND AND SUMMARY OF THE INVENTION

This invention relates generally to flip-down type sunglasses which are generally worn in athletic competition. The sunglasses may be moved to a horizontal positon so that they do not obscure the wearer's vision. The glasses may be quickly flipped down into a vertical position to shield the eyes from the sun. While a variety of flip-down constructions have been known in the art, such constructions have been less than completely satisfactory in that the structures required for the mounting and positioning the moveable visor have been difficult to inexpensively mass produce.

Generally speaking, in accordance with the invention, an improved construction for flip-down sunglasses is provided. The sunglasses have a fixed part which extends across the wearer's forehead and is attached by the use of earpieces and an elastic strap. Pivotedly mounted to the fixed part is a moveable part carrying a sun visor which may be flipped down by the wearer as desired. The moveable part has a pair of ribs which engage a groove carried on a flexible arm integral with the fixed part. The grooves engage the ribs to position the glasses either horizontally or vertically with respect to the wearer's face.

Accordingly, it is an object of this invention to provide an improved flip-down sunglass construction that may be inexpensively manufactured.

It is another object of this invention to provide an improved flip-down sunglass construction that may be manufactured using molding processes.

It is a further object of this invention to provide an improved flip-down sunglass construction that is relatively lightweight.

Still other objects of this invention will become apparent upon the reading of the detailed specification to follow.

BRIEF DESCRIPTION OF THE DRAWINGS

For a better understanding of the invention, reference is made to the following drawings, taken in connection with the specification, in which.

DESCRIPTION OF THE PREFERRED EMBODIMENT

Figure 1:
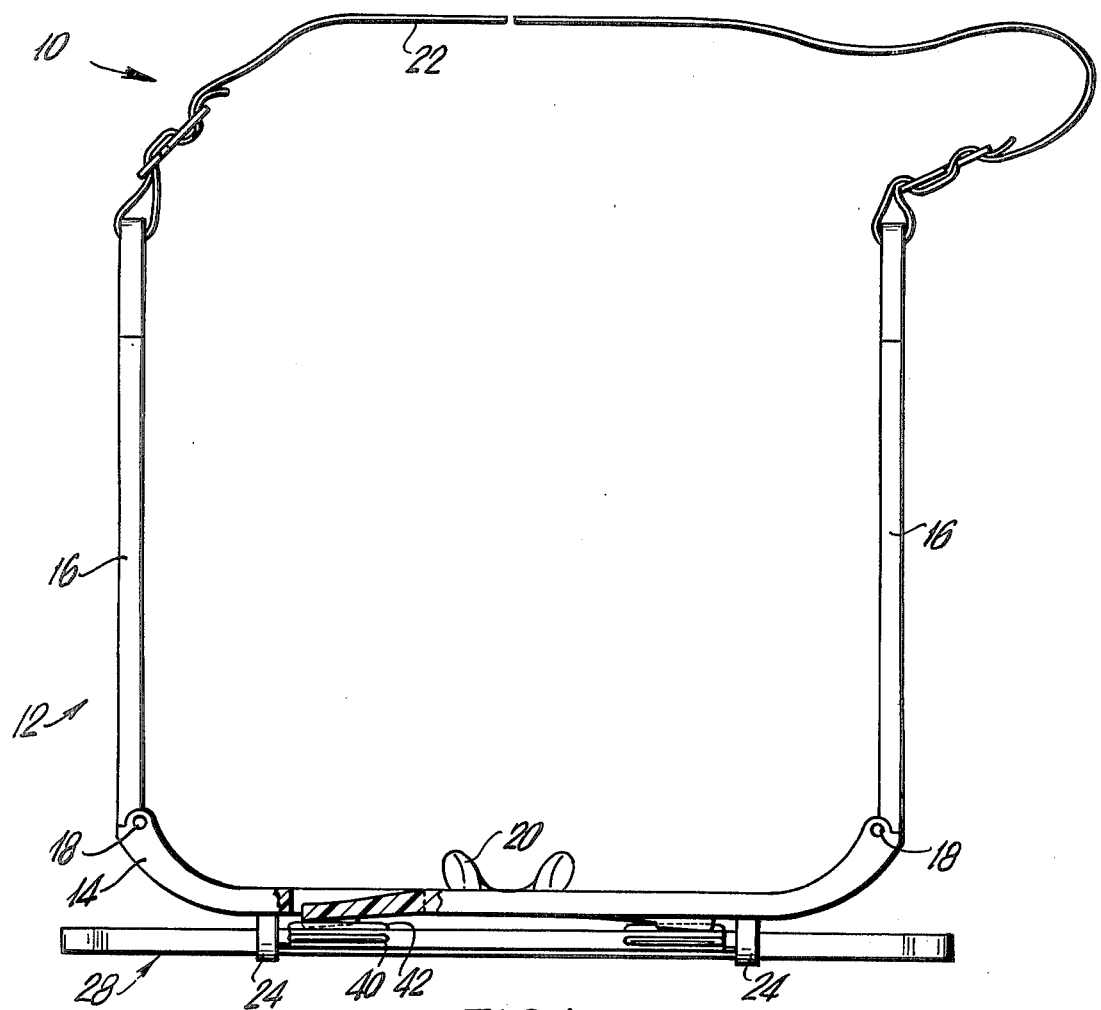
FIG. 1 is a top plan view of the flip-down sunglasses constructed in accordance with the preferred embodiment of the instant invention, with the moveable part positioning structure shown partially cut away for the sake of clarity and with the moveable part in its vertical position.
Figure 2:
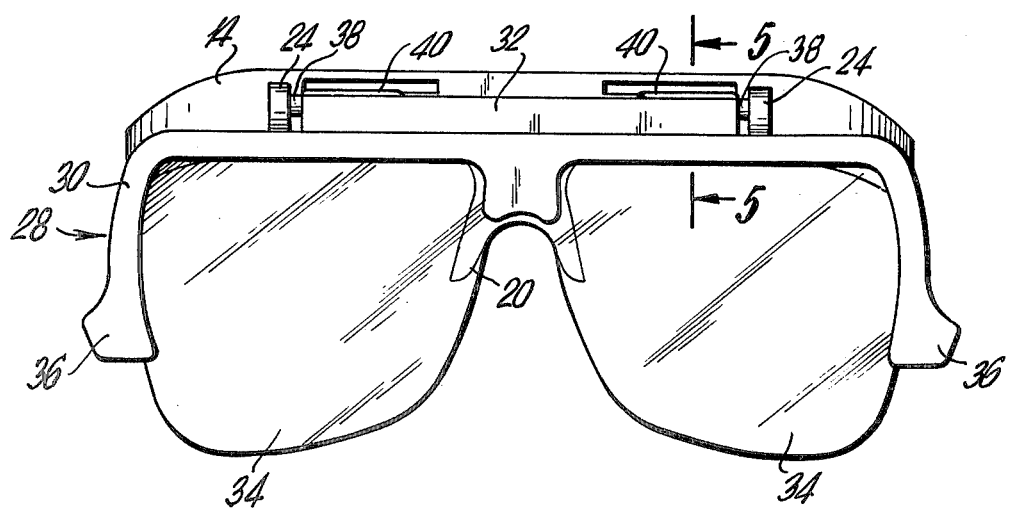
FIG. 2 is a front elevational view of the flip-down sunglasses with the moveable part in its downward position.
Figure 3:
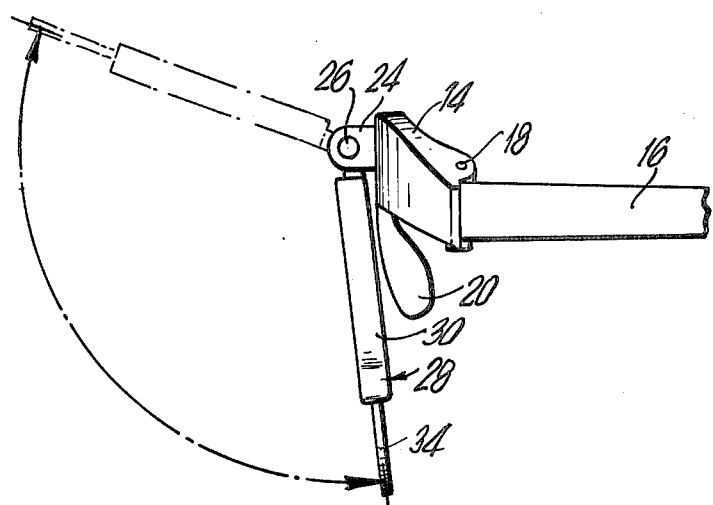
FIG. 3 is a partial side elevational view of the flip-down sunglasses with the moveable part in its vertical position and its upward position and direction of movement shown in phantom.
Figure 4:
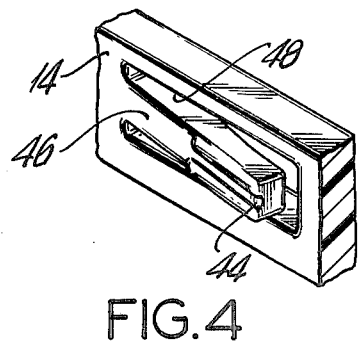
FIG. 4 is a partial perspective view of the flexible arm and groove structure for positioning the moveable portion of the sunglasses.

The drawings illustrate flip-down sunglasses generally indicated at 10 including a frame 12 which has a fixed frame part 14 and a pair of earpieces 16 hingedly connected thereto by means of pins 18. Fixed part 14 extends across the wearer's forehead and is shaped to conform thereto and includes a nose bridge 20 for positioning and support of same. An adjustable elastic strap 22 extends between each earpiece 16 to prevent sunglasses 10 from becoming accidentally dislodged. Extending forwardly from fixed part 14 are a pair of tabs 24, each having an opening 26 for pivotally mounting a moveable frame 28 to fixed part 14. Frame 28 includes a lower portion 30 shaped and adapted to receive a tinted visor 34 and an upper portion 32 which pivotally mounts it to fixed part 14. Each edge of portion 30 includes a tab 36 to permit it to be easily grasped by the wearer.

Extending laterally out each end of upper portion 32 are cylindrical rods 38 which ride in openings 26 in tabs 24 to permit moveable frame 28 and its attached visor 34 to be pivoted up and down with respect to fixed part 14. In order to position and lock moveable frame 28 with respect to fixed part 14, upper portion 32 includes two sets of ribs 40, 42 which are adapted to be engaged by grooves 44 carried by a pair of flexible arms 46 mounted in openings 48 in fixed part 14. Each arm 46 is formed as a unitary moldment with fixed part 14 and the natural resiliancy of the molding material such as plastic, will bias arms 46 into engagement with ribs 40, 42 to lock frame 28 into place.

Figure 5:
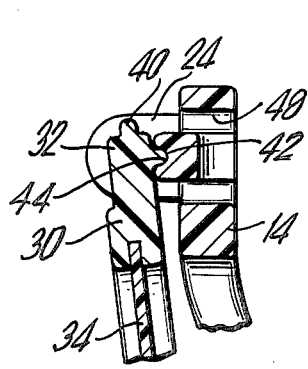
FIG. 5 is a partial sectional view taken along line 5—5 of FIG. 2.
Figure 6:
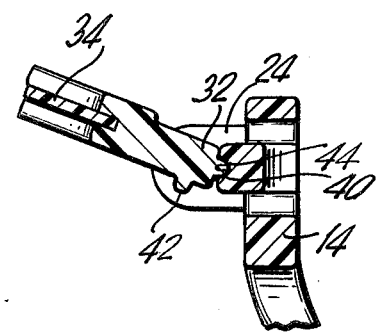
FIG. 6 is a partial sectional view corresponding to that of FIG. 5 with the moveable part shown in its upward position.

Ribs 40, 42 are disposed at right angles with respect to each other. When each rib 42 is in engagement with each groove 44, as shown in FIG. 5, moveable frame 28 will be disposed vertically downwardly with respect to fixed part 14 and thus visor 34 will be in place over the wearer's eye. When each rib 40 is in engagement with each groove 44 frame 28 will extend outwardly from fixed part 14 and thus visor 34 will not cover the wearer's eyes, as shown in FIG. 6. In order to pivot moveable frame 28, all the wearer need to do is grasp either tab 36 and move frame 28 to its desired position, as frame 28 is pivoted arms 44 will be displaced inwardly with respect to fixed part 14 to permit motion of frame 28.

Although the present invention has been described in conjunction with preferred embodiments, it is to be understood that modifications and variations may be resorted to without departing from the spirit and scope of the invention, as those skilled in the art will readily understand. Such modification and variations are considered to be within the purview and scope of the invention and the appended claims.

The appended claims are intended to cover all the generic and specific features of the invention, and all statements of the scope of the invention, which, as a matter of language, may be said to fall therebetween.

What is claimed is:

1. Sunglasses comprising a fixed part, means for attaching said fixed part to a wearer above said wearer's eyes, a moveable part pivotably joined to said fixed part, said moveable part including means for attenuating sunlight, said moveable part having a first position in which said sun attenuating means are positioned outwardly from said wearer so that said sun attenuating means are not positioned over the wearer's eyes, said moveable part having a second position in which said sun attenuating means are positioned over said wearer's eyes, said fixed part having at least one flexible arm disposed thereon, the longitudinal axis of said flexible arm extending parallel to the longitudinal axis of said fixed part, rib means disposed on at least one of said flexible arm and said moveable parts, and groove means for engagement with said rib means disposed on the other of said flexible arm and said moveable part, said rib and groove means releasably securing said moveable part of said first and said second positions.

2. The sunglasses as claimed in claim 1, wherein said fixed part includes a nose bridge and extends across and conforms to said wearer's forehead.

3. The sunglasses as claimed in claim 1, wherein said at least one flexible arm is biased into engagement with the other of said groove and said rib means.

4. The sunglasses as claimed in claim 1, wherein said flexible arm is integral with said fixed part.

5. The sunglasses as claimed in claim 4, wherein said flexible arm and said fixed part comprise a unitary moldment.

6. The sunglasses as claimed in claim 1, wherein said means for attaching said fixed part to said wearer comprise a pair of rearwardly extending earpieces, said earpieces engaging the sides of said wearer's head.

7. The sunglasses as claimed in claim 5, wherein said earpieces include adjustable strap means extending therebetween to further secure said sunglasses to said wearer.

* * * * *